United States Patent
Zheng et al.

(10) Patent No.: US 8,644,514 B2
(45) Date of Patent: Feb. 4, 2014

(54) SECURITY MODEL FOR A RELAY NETWORK SYSTEM

(75) Inventors: Haihong Zheng, Coppell, TX (US); Shashikant Maheshwari, Irving, TX (US); Adrian Boariu, Irving, TX (US)

(73) Assignee: Nokia Siemens Networks Oy, Espoo (FI)

( * ) Notice: Subject to any disclaimer, the term of this patent is extended or adjusted under 35 U.S.C. 154(b) by 568 days.

(21) Appl. No.: 12/607,604

(22) Filed: Oct. 28, 2009

(65) Prior Publication Data

US 2010/0111306 A1    May 6, 2010

Related U.S. Application Data

(60) Provisional application No. 61/110,222, filed on Oct. 31, 2008.

(51) Int. Cl.
*H04K 1/00* (2006.01)
*H04W 12/04* (2009.01)

(52) U.S. Cl.
USPC ............ 380/270; 713/170; 370/315; 370/335

(58) Field of Classification Search
USPC ................. 380/270; 713/170; 370/315, 335
See application file for complete search history.

(56) References Cited

U.S. PATENT DOCUMENTS

| | | | |
|---|---|---|---|
| 2009/0019284 A1* | 1/2009 | Cho et al. | 713/170 |
| 2009/0074189 A1* | 3/2009 | Ryu et al. | 380/277 |
| 2009/0271626 A1* | 10/2009 | Wang | 713/170 |

OTHER PUBLICATIONS

Cudak, Mark, "IEEE 802.16m System Requirements", IEEE 802.16m Broadband Wireless Access Working Group, IEEE 802.16m-07/002r4 (Oct. 19, 2007), 26 pages.

"IEEE Standard for Local and metropolitan area networks; Part 16: Air Interface for Fixed Broadband Wireless Access Systems", IEEE Std. 802.16-2004 (Oct. 1, 2004), 893 pages.

"Part 16: Air Interface for Fixed and Mobile Broadband Wireless Access Systems, Multihop Relay Specification", Draft Amendment to IEEE Standard for Local and Metropolitan area networks, IEEE P802.16j/D6a (Jul. 23, 2008), 314 pages.

* cited by examiner

*Primary Examiner* — Brandon Hoffman
*Assistant Examiner* — Samuel Ambaye
(74) *Attorney, Agent, or Firm* — Brake Hughes Bellermann LLP

(57) ABSTRACT

According to one general aspect, a method may include acquiring a message. In some embodiments, the method may also include determining if a relay station (RS) is allowed to manipulate portions of the message. In some embodiments, the method may also include, if so, generating a message authentication code (MsgAC) based upon a MsgAC key (MsgACK) known to the RS. In some embodiments, the method may also include combining the message with the MsgAC. In some embodiments, the method may also include wirelessly transmitting the combined message to the RS.

18 Claims, 8 Drawing Sheets

500

600

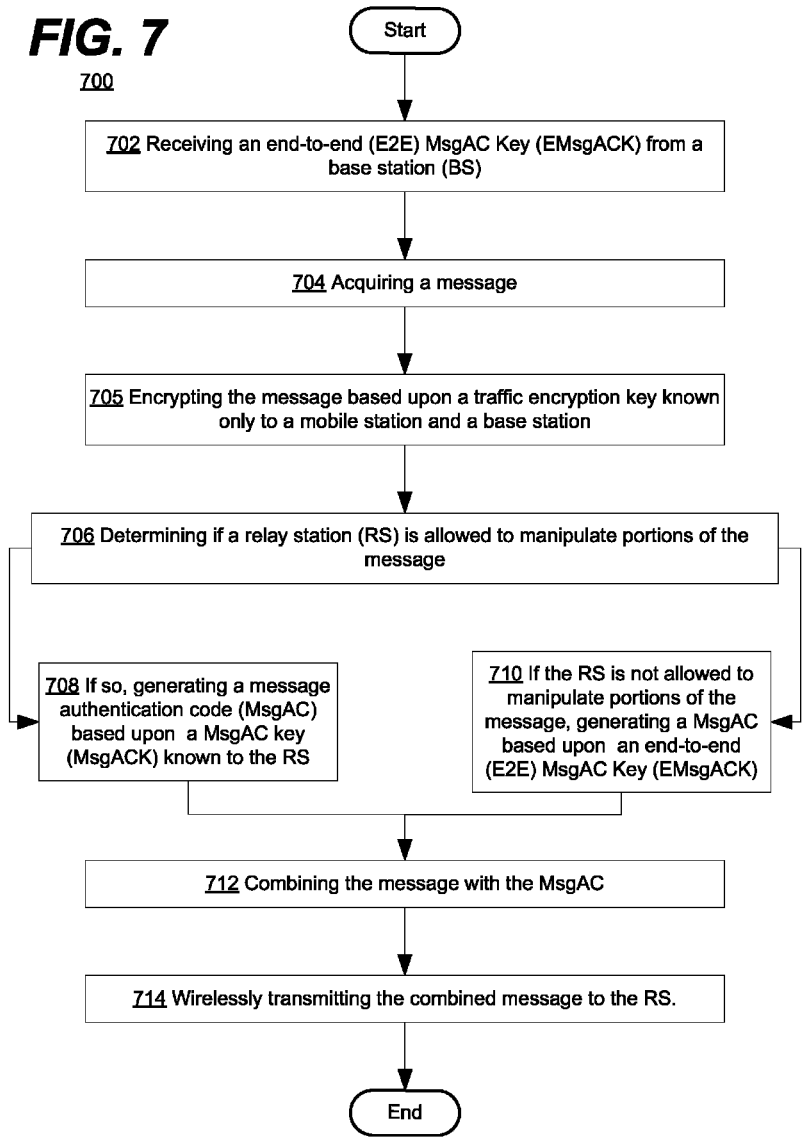

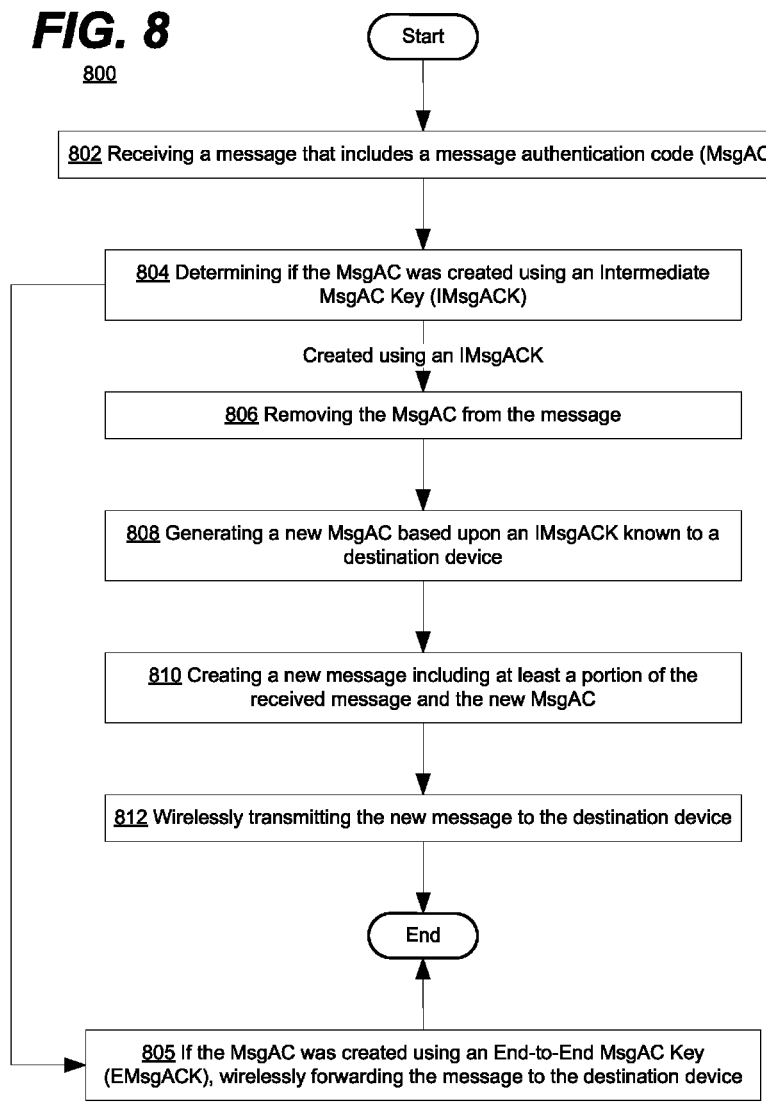

SECURITY MODEL FOR A RELAY NETWORK SYSTEM

CROSS-REFERENCE TO RELATED APPLICATION

This application claims priority under 35 U.S.C. §119 to Provisional U.S. patent application Ser. No. 61/110,222, filed Oct. 31, 2008, titled "Security Model For A Relay Network System," which is incorporated herein by reference in its entirety.

TECHNICAL FIELD

This description relates to communications and more specifically to the security in a relay network system.

BACKGROUND

Worldwide Interoperability for Microwave Access (WiMAX) is a telecommunications technology often aimed at providing wireless data over long distances (e.g., kilometers) in a variety of ways, from point-to-point links to full mobile cellular type access. A network based upon WiMAX is occasionally also called a Wireless Metropolitan Access Network (WirelessMAN or WMAN); although, it is understood that WMANs may include protocols other than WiMAX. WiMAX often includes a network that is substantially in compliance with the IEEE 802.16 standards, their derivatives, or predecessors (hereafter, "the 802.16 standard"). Institute of Electrical and Electronics Engineers, *IEEE Standard for Local and Metropolitan Area Networks, Part 16*, IEEE Std. 802.16-2004.

One particular derivative of the 802.16 standard is the 802.16m standard that attempts to increase the data rate of wireless transmissions to 1 Gbps while maintaining backwards compatibility with older networks. IEEE 802.16 Broadband Wireless Access Working Group, *IEEE 802.16m System Requirements*, Oct. 19, 2007.

SUMMARY

According to one general aspect, a method may include acquiring a message. In some embodiments, the method may also include determining if a relay station (RS) is allowed to manipulate portions of the message. In some embodiments, the method may also include, if so, generating a message authentication code (MsgAC) based upon a MsgAC key (MsgACK) known to the RS. In some embodiments, the method may also include combining the message with the MsgAC. In some embodiments, the method may also include wirelessly transmitting the combined message to the RS.

According to another general aspect, an apparatus may include a processor and a transceiver. In various embodiments, the apparatus may be configured to acquire a message. In various embodiments, the apparatus may be configured to determine if a relay station (RS) is allowed to manipulate portions of the message. In various embodiments, the apparatus may be configured to if so, generate a message authentication code (MsgAC) based upon a MsgAC key (MsgACK) known to the RS. In various embodiments, the apparatus may be configured to combine the message with the MsgAC. In various embodiments, the apparatus may be configured to wirelessly transmit the combined message to the RS.

According to another general aspect, an apparatus may include a processor. In various embodiments, the processor may be configured to receive a message that includes a message authentication code (MsgAC). In various embodiments, the processor may be configured to determine if the MsgAC was created using an Intermediate MsgAC Key (IMsgACK). In various embodiments, the processor may be configured to, if so, remove the MsgAC from the message. In various embodiments, the processor may be configured to generate a new MsgAC based upon an IMsgACK known to a destination device. In various embodiments, the processor may be configured to create a new message including at least a portion of the received message and the new MsgAC. In various embodiments, the processor may be configured to cause the new message to be wirelessly transmitted to the destination device.

According to another general aspect, a method may include receiving a message that includes a message authentication code (MsgAC). In various embodiments, the method may also include determining if the MsgAC was created using an Intermediate MsgAC Key (IMsgACK). In various embodiments, the method may also include, if so, removing the MsgAC from the message. In various embodiments, the method may also include generating a new MsgAC based upon an IMsgACK known to a destination device. In various embodiments, the method may also include creating a new message including at least a portion of the received message and the new MsgAC. In various embodiments, the method may also include wirelessly transmitting the new message to the destination device.

According to another general aspect, an apparatus may include a means for acquiring a message. In various embodiments, the apparatus may also include a means for determining if a relay station (RS) is allowed to manipulate portions of the message. In various embodiments, the apparatus may also include a means for, if so the message is allowed to manipulate portions of the message, generating a message authentication code (MsgAC) based upon a MsgAC key (MsgACK) known to the RS. In various embodiments, the apparatus may also include a means for, if so the message is allowed to manipulate portions of the message, combining the message with the MsgAC. In various embodiments, the apparatus may also include a means for, if so the message is allowed to manipulate portions of the message, wirelessly transmitting the combined message to the RS.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

BRIEF DESCRIPTION OF THE DRAWINGS

FIG. 7 is a flow chart of an example embodiment of a technique in accordance with the disclosed subject matter.

FIG. 8 is a flow chart of an example embodiment of a technique in accordance with the disclosed subject matter.

DETAILED DESCRIPTION

Figure 1:
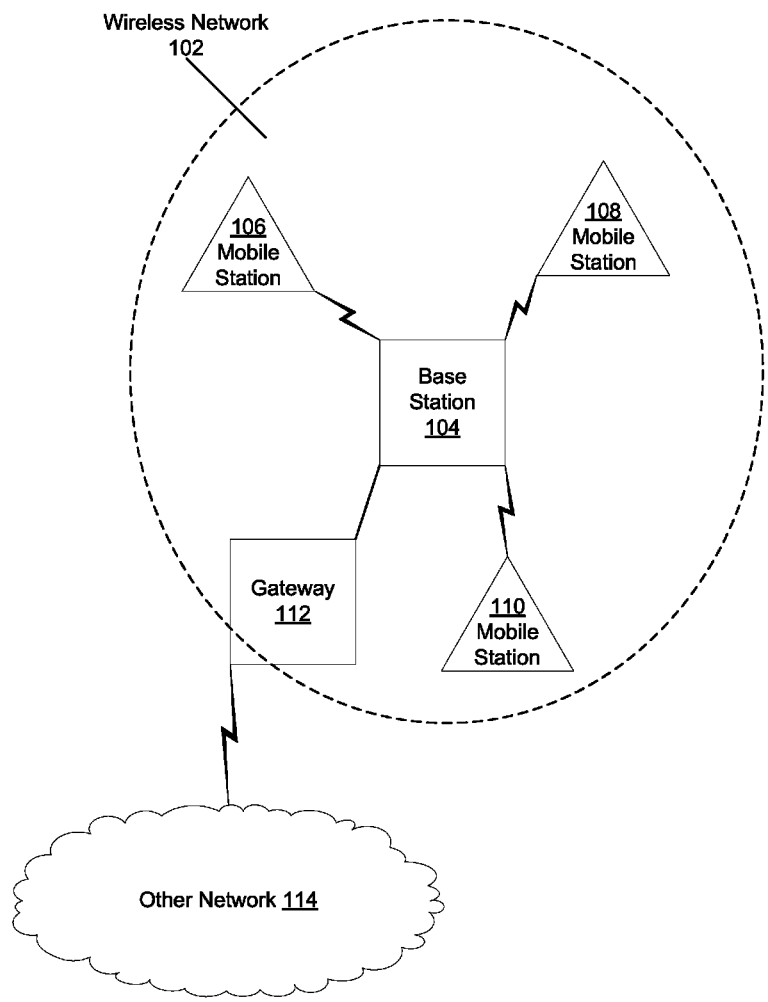
FIG. 1 is a block diagram of an example embodiment of a system in accordance with the disclosed subject matter.

Referring to the Figures in which like numerals indicate like elements, FIG. 1 is a block diagram of a wireless network 102 including a base station (BS) 104 and mobile stations (MSs) 106, 108, 110, according to an example embodiment. Each of the MSs 106, 108, 110 may be associated with BS 104, and may transmit data in an uplink (UL) direction to BS 104, and may receive data in a downlink (DL) direction from BS 104, for example. Although only one BS 104 and three mobile stations (MSs 106, 108 and 110) are shown, any number of base stations and mobile stations may be provided in network 102. Also, although not shown, mobile stations 106, 108 and 110 may be coupled to base station 104 via relay stations or relay nodes, for example. The base station 104 may be connected via wired or wireless links to another network (not shown), such as a Local Area Network (LAN), a Wide Area Network (WAN), the Internet, etc. In various embodiments, the base station 104 may be coupled or connected with the other network 120 via an access network controller (ASN) or gateway (GW) 112 that may control, monitor, or limit access to the other network.

Figure 2:
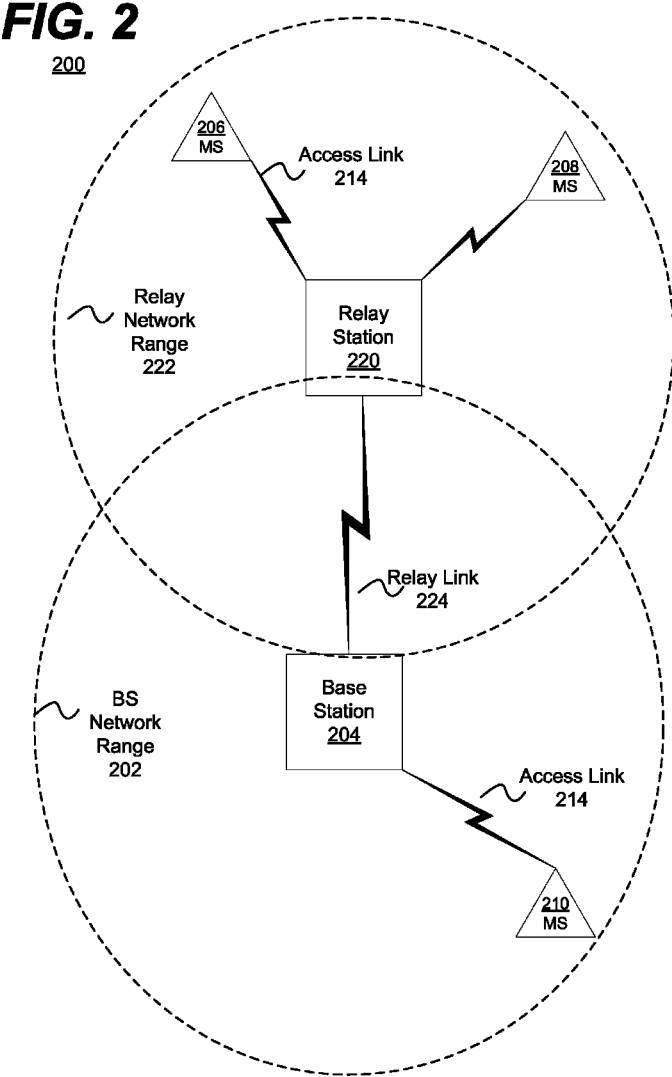
FIG. 2 is a block diagram of an example embodiment of a system in accordance with the disclosed subject matter.

FIG. 2 is a block diagram of an example embodiment of a system 200 in accordance with the disclosed subject matter. As described above, in various embodiments, the MSs may be in communication with the BS via a relay station. In one embodiment, the system 200 may include a BS 204 in direct communication with a MS 210 and a relay station (RS) 220. The RS 220 may be in direct communication with the MSs 206 and 208, and the BS 204. In various embodiments, the BS 204 may have a certain wireless range 202. Likewise the RS 220 may have a wireless range 222.

In various embodiments, the MSs 206 and 208 may be too far away from the BS 204 to allow direct communication or communication with high throughput; they may be outside of the BS network range 202. However, these two MSs 206 and 208 may be within the RS network range 222, allowing communication with the RS 220. The RS 220 may then relay messages between the MSs 206 and 208 and the BS 204. This relay may be bi-directional (e.g., both uplink and downlink) In this context, a wireless relay network may be a multi-hop system in which end nodes (e.g., MSs, subscriber stations (SSs), etc.) are connected to the BS 204 or Access Point (AP) via RS 220. All the traffic between the remote MSs 206 and 208 and BS 204 passes through and may be processed by the RS 220. In various embodiments, multiple RSs (not shown) may be figuratively chained together to link a MS with a BS.

In this context the link or communications link between the RS 220 and the BS 204 may be referred to as a relay link 224. In this context, a link or communications link ending at a MS may be referred to as an access link 214 (labeled twice to illustrate that the link terminates at an MS regardless of being attached to the RS 220 or the BS 204).

In various embodiments, the MS 106 may transmit user data or other messages (e.g., medium access control (MAC) management messages, etc.) to the BS 204 via the RS 220. Once received by the RS 220, the user data and message may be retransmitted to the BS 204. A similar operation may occur in the downlink direction.

In various embodiments, the RS 220 may amalgamate several MS user data and messages from multiple MSs (e.g., MSs 206 and 208). In such an embodiment, MS 206 may transmit a first user's data and message to the RS 220 and the MS 208 may transmit a second user's data and message to the RS 220. The RS 220 may then repackage these two user data and messages into a single larger user data and message. This user data or message may then be retransmitted to the BS 204. Likewise, in various embodiments, the RS 220 may break large user data or messages from an MS into smaller user data or messages for transmittal to BS 204. In some embodiments, these smaller units may be referred to as "fragments". In various embodiments, this may be desirable to fully utilize a resource allocation assigned to the RS 220.

In various embodiments, two security models may exist for authorizing and authenticating messages relayed by the RS 220. In one embodiment, a centralized model may be used in which all traffic between the BS 204 and an MS (e.g., MS 206) is encrypted end-to-end (BS to MS, and vice versa). In such an embodiment, the RS 220 may not be able to read or otherwise manipulate messages (e.g., group messages, fragment message, etc.). In addition, in such an embodiment, the RS 220 may receive little if any encryption or authentication keys.

In another embodiment, a distributed security model may be used. In such an embodiment, the RS 220 may be provided with most or all of the security keys given to an MS (e.g., MS 206). In such an embodiment, the RS 220 may freely manipulate messages (e.g., group messages, fragment message, etc.). But, the security keys transferred to the RS 220 are often transferred over a wireless interface that is highly susceptible to attack or eave dropping, for example. Furthermore, since an RS 220 is often physically deployed where it may be accessed (both physically and via the network) by a large number of people, the RS itself (and hence the keys and messages stored by it) may be open to attack.

In one embodiment, a mixed security mode may be employed. In such an embodiment, the RS 220 may know or include authorization keys such that the transmitter of a message may be verified (e.g., forged packets may be detected, etc.). However, in one embodiment, a portion of the transmitted messages may be encrypted using an encryption key known only to the MS (e.g., MS 206) and BS 204, such that the RS 220 may not eave-drop on the MS, for example. Various embodiments of such a security model are described below.

Figure 3:
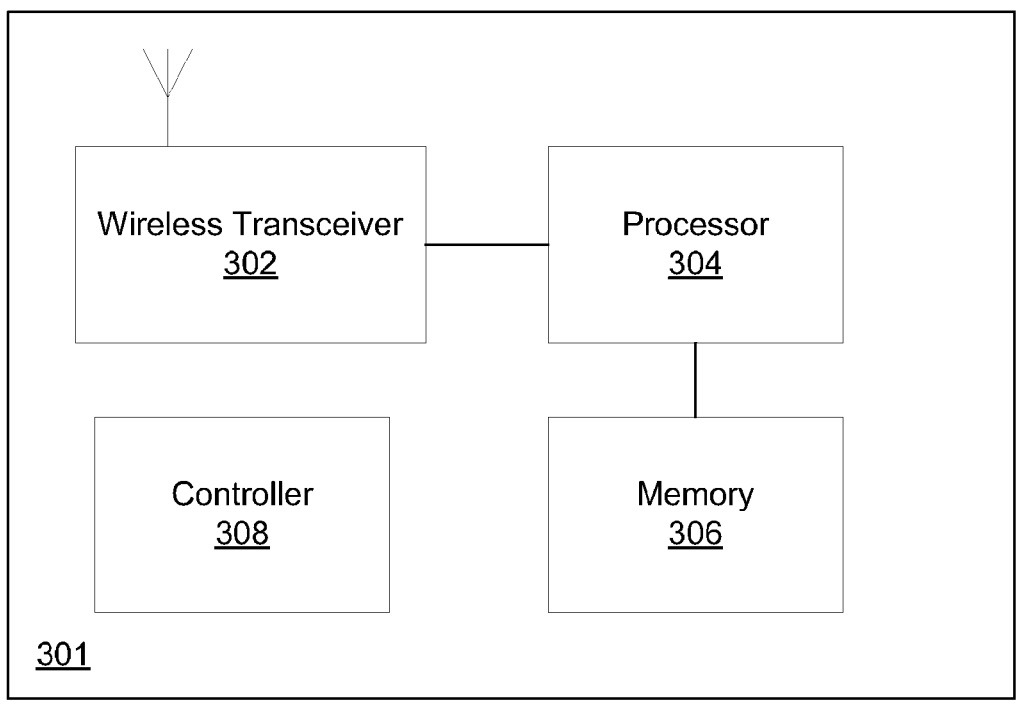
FIG. 3 is a block diagram of an example embodiment of a system in accordance with the disclosed subject matter.

FIG. 3 is a block diagram of an example embodiment of a system or apparatus 301 in accordance with the disclosed subject matter. The apparatus or wireless station 301 (e.g., base station 104, mobile station 106, relay station 220, etc.) may include, for example, an RF (radio frequency) or wireless transceiver 302, including a transmitter to transmit signals and a receiver to receive signals, a processor or baseband processor 304 to execute instructions or software and control transmission and receptions of signals, and a memory 306 to store data and/or instructions.

Processor 304 may also make decisions or determinations, generate frames or messages for transmission, decode received frames or messages for further processing, and other tasks or functions described herein. Processor 304, which may be a baseband processor, for example, may generate messages, packets, frames or other signals for transmission via wireless transceiver 302. Processor 304 may control transmission of signals or messages over a wireless network, and may receive signals or messages, etc., via a wireless network (e.g., after being down-converted by wireless transceiver 302, for example). Processor 304 may be programmable and capable of executing software, firmware, or other instructions stored in memory or on other computer media to perform the various tasks and functions described above, such as one or more of the tasks or methods described above. Processor 304 may be (or may include), for example, hardware, programmable logic, a programmable processor that executes software or firmware, and/or any combination of these. Using other terminology, processor 304 and transceiver 302 together may be considered as a wireless transmitter/receiver system, for example.

In addition, a controller (or processor) 308 may execute software and instructions, and may provide overall control for the station 301, and may provide control for other systems not shown in FIG. 3, such as controlling input/output devices (e.g., display, keypad), and/or may execute software for one or more applications that may be provided on wireless station 301, such as, for example, an email program, audio/video applications, a word processor, a Voice over IP application, or other application or software.

In addition, a storage medium may be provided that includes stored instructions, which when executed by a controller or processor may result in the processor 304, or other controller or processor, performing one or more of the functions or tasks described above.

Figure 4:
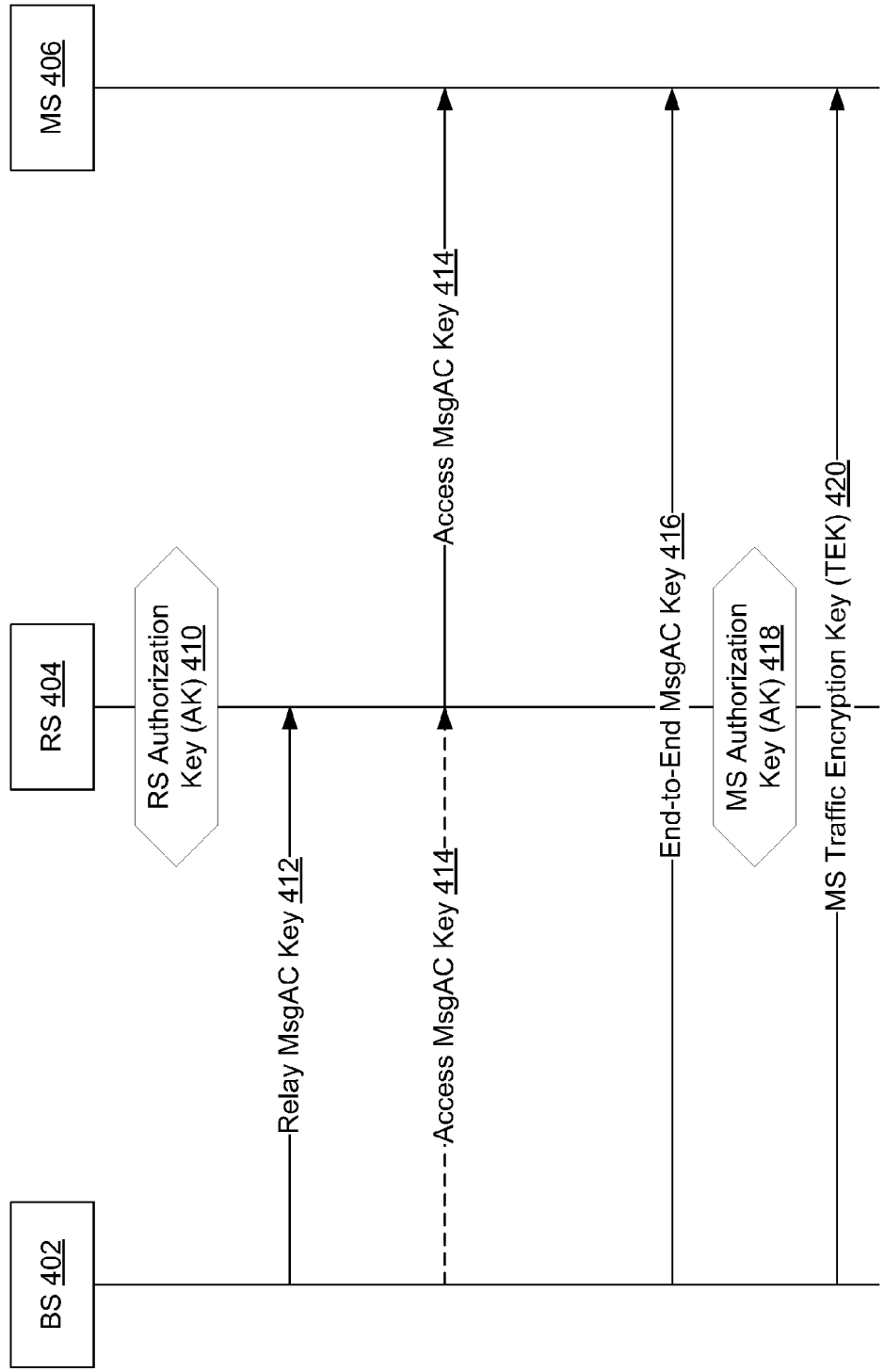
FIG. 4 is a block diagram of an example embodiment of a system in accordance with the disclosed subject matter.

FIG. 4 is a block diagram of an example embodiment of a system 400 in accordance with the disclosed subject matter. In various embodiments, the system 400 may include a base station (BS) 402, a relay station (RS) 404, and at least one mobile station (MS) 406. In various embodiments, the system 400 may use a mixed-mode security system that includes both centralized security keys and distributed security keys.

In such an embodiment, RS authorization key (AK) 410 may be generated locally by the RS 404. In some embodiments, the RS-AK 410 may be derived using a master key which may be preconfigured into the RS 404. In various embodiments, this RS-AK 410 may be used to generate encryption keys for use solely between the BS 402 and the RS 404, as opposed to keys used to forward messages to and from the MS 406.

In one embodiment, the BS 402 may also distribute a Relay Message Authentication Code (MsgAC) Key 412 to the RS 404. In another embodiment, the RS 404 may derive the MsgAC Key 412 from its RS-AK 410. In various embodiments, the Relay MsgAC Key (RMsgACK) 412 may be used by the RS 404 and the BS 402 to authenticate the origin of messages transmitted between the two devices. In various embodiments, a message that is created or manipulated by either the BS 402 or RS 404 and transmitted to the other may be encoded or signed using this RMsgACK 412. In some embodiments, the receiving device may test the message to assure that it was, in fact, created by the signing device, as described below.

In various embodiments, the RMsgACK 412 may include two or more MsgACKs. In one embodiment, a data RMsgACK may be distributed that is used only for user data traffic. In one embodiment, a control RMsgACK may be distributed for use with control messages (e.g., MAC management messages, etc.).

In one embodiment, the RS 404 may distribute an Access MsgAC Key (AMsgACK) 414 to the MS 406. In various embodiments, this AMsgACK 414 may be used similarly between the RS 404 and MS 406 as the RMsgACK 412 is used by the BS 402 and RS 404. In various embodiments, a transmitting device may sign or encode a message using this AMsgACK 414. The receiving device may authenticate the origin of the received message using the AMsgACK 414, as described below.

In some embodiments, the AMsgACK 414 may be distributed by the BS 402 to both the RS 404 and the MS 406 (via the RS 404). In various embodiments, the AMsgACK 414 may include two or more MsgACKs. In one embodiment, a data AMsgACK may be distributed that is used only for user data traffic. In one embodiment, a control AMsgACK may be distributed for use with control messages (e.g., MAC management messages, etc.).

In various embodiments, the RMsgACK 412 along with the Access MsgAC Key (AMsgACK) 414 may be considered Intermediate MsgAC Keys (IMsgACKs). In this context, an IMsgACK may be any MsgAC Key that is shared or used by a RS (e.g., RS 404). In various embodiments, signatures or access codes created using an IMsgACK may be removed and replaced by an intermediate device (e.g., RS 404) when a message is manipulated or forwarded to a third device (e.g., BS 402 in the uplink case, MS 406 in the downlink case, or another RS (not shown), etc.). This is contrasted with an End-to-End (E2E) MsgAC Key (EMsgACK) (e.g., EMsgACK 416) which may be used to authenticate a message all the way from a MS to a BS, or vice versa, as described below. In such an embodiment, the distribution of the MsgACKs may overcome or avoid some of the security deficiencies of a centralized security model.

In various embodiments, the BS 402 may distribute an EMsgACK 416 to the MS 406. In various embodiments, this may involve the RS 404 relaying or forwarding the distribution message to the MS 406. But, in such an embodiment, the information contained in the message (e.g., the EMsgACK 416) may not be accessible (e.g., encrypted) to the RS 404. In some embodiments, the EMsgACK 416 may be derived locally from other previously distributed or preconfigured keys. In various embodiments, the EMsgACK 416 may provide a relatively secure key to use when the MS 406 wishes to transmit to the BS 402 without interference or manipulation (e.g., repacking, fragmentation, etc.), and vice versa, as described below. In various embodiments, the EMsgACK 416 may be used to communicate control messages (e.g., MAC management messages, etc.) to/from the MS 406. In various embodiments, various messages identifiers (e.g., connection identifiers (CIDs), message types, standard dictates, etc.) may be used to determine if a particular message should be signed using an IMsgACK or an EMsgACK.

In various embodiments, a MS authorization key (AK) 418 may be generated by the MS 406 locally. In some embodiments, the MS-AK 418 may be derived using a master key which may be preconfigured into the MS 406. In various embodiments, this MS-AK 418 may be similar functionally to the RS-AK 410. In one embodiment, the MS-AK 418 may be used to generate or derive encryption keys for use between the BS 402 and the MS 406.

In various embodiments, the BS 402 may distribute a Traffic Encryption Key (TEK) 420 or parameters used to derive TEK 420 to the MS 406. In various embodiments, this TEK 420 or parameters used to derive TEK 420 may be to encrypt/decrypt user data or messages (e.g., to prevent data eavesdropping, etc.), as described below. In one embodiment, the distribution of the TEK 420 may include the use of a key (e.g., a key encryption key (KEK)) derived from the MS-AK 418 or other AK. As described above, in various embodiments, this distribution may include using the RS 404 to forward the distribution message without accessing the information (e.g., the TEK 420 or parameters used to derive TEK 420) contained within the message. In such an embodiment, the encrypted distribution of the TEK 420 or parameters used to derive TEK 420 may overcome or avoid some of the security deficiencies of a distributed security model.

In various embodiments, some or all of the keys may be refreshed or changed. In some embodiments, the keys may age, ultimately becoming of no or little use. Hereafter, the following figures and embodiments will be described assuming fresh and useful keys. In various embodiments, in which some of the keys need refreshing the keys may be refreshed using one or more techniques dictated by the networking standard employed by the system 400.

In various embodiments, the MS 406 may include at least one Security Association (SA). In some embodiments, an SA may include a set of security information shared between a MS and an aggregating device (e.g., a BS, RS, etc.) that is capable functioning as the other end of an access link (e.g., access link 214 of FIG. 2). In some embodiments, SAs may be identified using SA identifiers (SAIDs).

In various embodiments, the information shared via an SA may include the Cryptographic Suite employed within the SA. In some embodiments, the shared information may include TEKs, Initialization Vectors, cryptographic algorithms (e.g., Data Encryption Standard (DES), etc.) used to communicate between the two ends (e.g., MS & BS, MS & RS, etc.) of the SA.

Traditionally one SA included only one type of cryptographic suite (e.g., one type of encryption algorithm, etc.). In various embodiments of the disclosed subject matter, one SA may include one or more types of cryptographic suites. For example, in one embodiment, when MS 406 is attached or in direct communication with the RS 404, one type of cryptographic suite may be used (e.g., a first TEK, a first encryption algorithm, etc.). However, when the MS 406 is attached or in direct communication with the BS 402 (i.e., a RS is not used to forward information, e.g., the MS 406 may have moved closer to the BS 402), another cryptographic suite may be used (e.g., a second TEK, a second encryption algorithm, etc.). In various embodiments, which suite to use when may be identified during SA configuration and setup. In some embodiments, the key (e.g., TEK, etc.) used for these different cryptographic suite may be the same.

Figure 5:
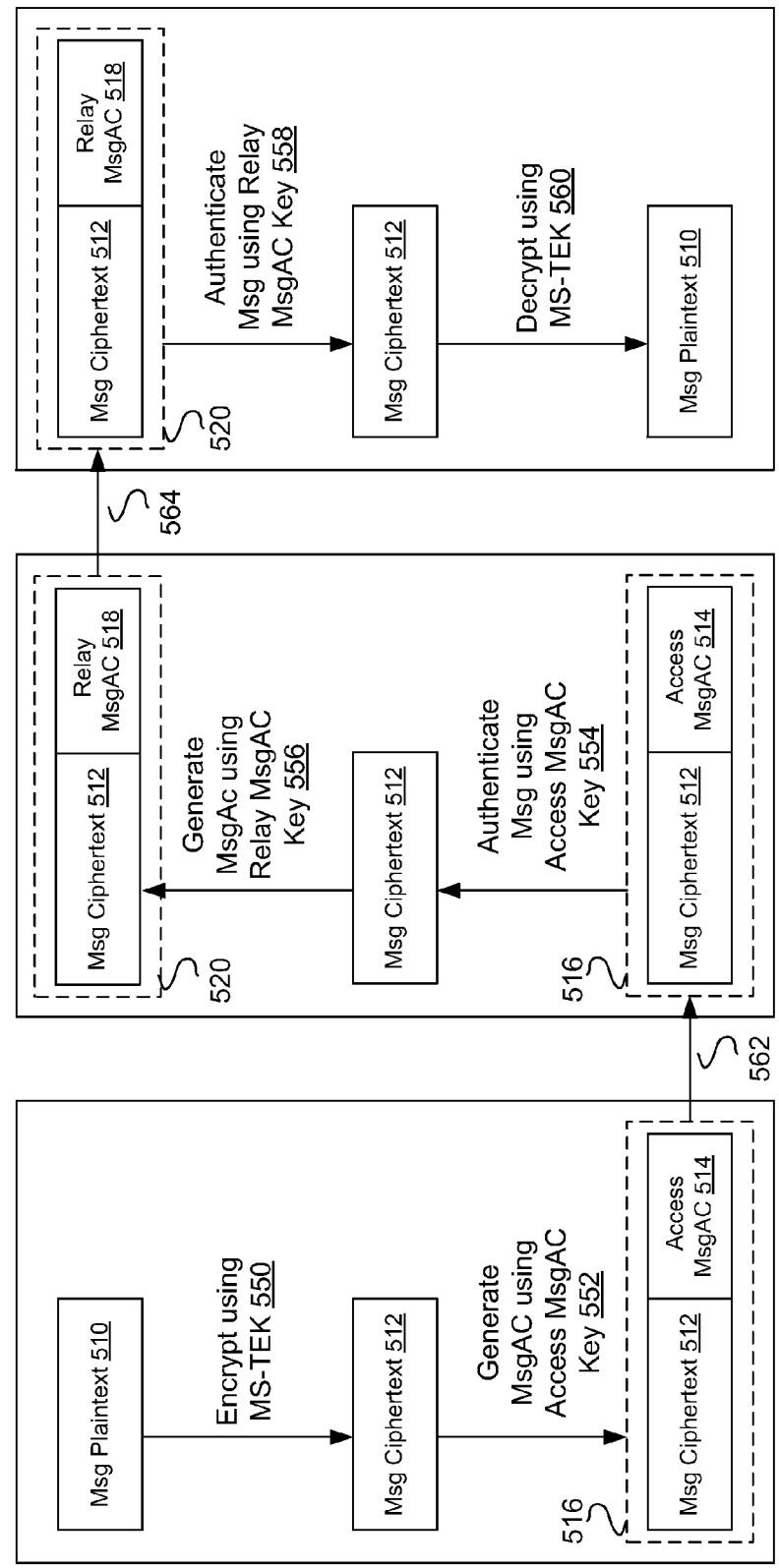
FIG. 5 is a block diagram of an example embodiment of a system in accordance with the disclosed subject matter.

FIG. 5 is a block diagram of an example embodiment of a system 500 in accordance with the disclosed subject matter. In various embodiments, the system 500 may include a BS 502, a RS 504, and a MS 506. In the illustrated embodiment, a message is transmitted in the uplink direction from the MS 506 to the BS 502. It is understood, that in other embodiments a message transmitted in the downlink direction from the BS 502 to the MS 506 may undergo a similar process. In various embodiments, the message of information transferred may include user data or control information, as described above.

In various embodiments, the MS 506 may create a message in plaintext 510. In such an embodiment, the plaintext message 510 may include the information of the message in a clear relatively (machine) readable format. In some embodiments, this plaintext message 510 may include user data. In another embodiment, the plaintext message 510 may include control information (e.g., a MAC management message, etc.).

In various embodiments, the MS 506 may encrypt this plaintext message 510 into a ciphertext message 512 (illustrated as arrow 550). In some embodiments, this encryption may take place using the TEK. In various embodiments, only the payload portion of the plaintext message 510 may be encrypted, leaving one or more headers accessible without encryption, although, it is understood that the above is merely one illustrative example to which the disclosed subject matter is not limited. In various embodiments, the TEK may be used to encrypt the message or at least the payload portion end-to-end (MS-to-BS) because the RS 504 has not received or been made aware of the TEK, as described above.

In various embodiments, the MS 506 may then sign or authenticate the ciphertext message 512 by creating or generating a Message Authentication Code (MsgAC) 514 (illustrated as arrow 552). In such an embodiment, a MsgAC Key (MsgACK) may be used to generate the MsgAC 514. In various embodiments, this MsgAC 514 may be added (e.g., concatenated with, appended, prefixed, etc.) to the message ciphertext 512. In another embodiment, the MsgACK may be used to encrypt the ciphertext message 512 (not shown), instead of creating a separate MsgAC 514; although, it is understood that the above is merely one illustrative example to which the disclosed subject matter is not limited.

In the illustrated embodiment, the Access MsgACK (AMsgACK) is used, allowing the signature to be understood by the RS 504 which also knows the AMsgACK, as described above. As described above, the link between the MS 506 and the RS 504 is described as an access link (e.g., access slink 214 of FIG. 2). In various embodiments, in which the message includes user data, an Access Data MsgACK may be used to sign the ciphertext 512. In another embodiment, in which the message includes control information that may be viewable by the RS 504, an Access Control MsgACK may be used. Although, it is understood that the above are merely a few illustrative examples to which the disclosed subject matter is not limited.

In various embodiments, the MS 506 may then transmit this message 516 (including the ciphertext 512 and the MsgAC 514) to the BS 502 via the RS 504 (illustrated by arrow 562). In some embodiments, this transmission 562 may wait or use an allocated physical resource unit (e.g., resource block, etc.).

In one embodiment, the RS 504 may receive the message 516 (including the ciphertext 512 and the MsgAC 514). In various embodiments, the RS 504 may attempt to authenticate that the message was actually transmitted by the MS 506. In various embodiments, the RS 504 may receive or be configured to guard against receipt of forged or other inappropriate messages; although, it is understood that the above is merely one illustrative example to which the disclosed subject matter is not limited.

In one embodiment, the RS 504 may authenticate the message using the AMsgACK assigned to the MS 506 (illustrated by arrow 554). In various embodiments, the RS 504 may maintain or keep a plurality of AMsgACKs, at least one for each MS associated with the RS 504. In various embodiments, authenticating the message 516 may include determining if the message 516 was signed using an IMsgACK or an EMsgACK. If the message was signed or created suing an EMsgACK, the RS 504 may simply forward the message along, as described below in reference to FIG. 6.

In various embodiments, if the message 516 fails the authentication test or determination, the RS 504 may drop or otherwise discard the message 516. In such an embodiment, the RS 504 may make more efficient use of the network's resources by culling such failed messages. In various embodiments, other forms of authentication failure handling may be used and it is understood that the above is merely one illustrative example to which the disclosed subject matter is not limited.

In one embodiment, once the message 516 is authenticated, the RS 504 may remove the AMsgAC 514 from the message 516. In various embodiments, the RS 504 may manipulate the payload or ciphertext message 512 as convenient. In various embodiments, this may include repacking the ciphertext message 512 with additional ciphertext messages from the same MS 506. In another embodiment, this manipulation may include repacking the ciphertext message 512 with additional ciphertext messages from the other MSs (e.g., MSs 208 or 210 of FIG. 2). In yet another embodiment, this manipulation may include fragmenting the ciphertext message 512 into smaller portions, and selecting a portion to be included into the resultant message (e.g., message 520). In some embodiments, the form and extent of the manipulation may be based upon network efficiency concerns as viewed by the RS 504.

In various embodiments, because the ciphertext 512 is encrypted using the TEK, which is unknown to the RS 504, the RS 504 may not be aware of the information included in the ciphertext 512. However, in one embodiment, the manipulation may not depend on intimate knowledge of the information included in the ciphertext 512.

In various embodiments, the ciphertext 512 or a new payload portion including at least a portion of the ciphertext 512 (e.g., repacking, fragmenting, etc.) may be signed by the RS 504 using the RS's MsgACK (illustrated as arrow 556). In various embodiments, this may include the use of a Relay MsgACK (RMsgACK) that is known to the RS 504 and BS 502 or, in another embodiment, a second or subsequent RS (not shown). In various embodiments, this may occur similarly to the signature generation illustrated by arrow 552, as described above. In one embodiment, this may result in the Relay MsgAC (RMsgAC) 518.

In various embodiments, the RS 504 may transmit the message 520 (including the ciphertext 512, and the RMsgAC 518) to the BS 502 (illustrated by arrow 564). In various embodiments, this transmission may occur wirelessly via a relay link (e.g., relay link 224 of FIG. 2).

In various embodiments, the BS 502 may authenticate the message 520 (illustrated by arrow 558), in a similar fashion as the RS 504 authenticated the message 516. In one embodiment, the authentication may include the use of the RS's RMsgACK, as described above.

If the message authentication succeeds, the BS 502 may decrypt the ciphertext 512 to produce the message plaintext 510 (illustrated by arrow 560). In various embodiments, the decryption may include the use of the TEK assigned to the MS 506. In various embodiments, the TEK may be known only to the BS 502 and the MS 506, as described above.

Figure 6:
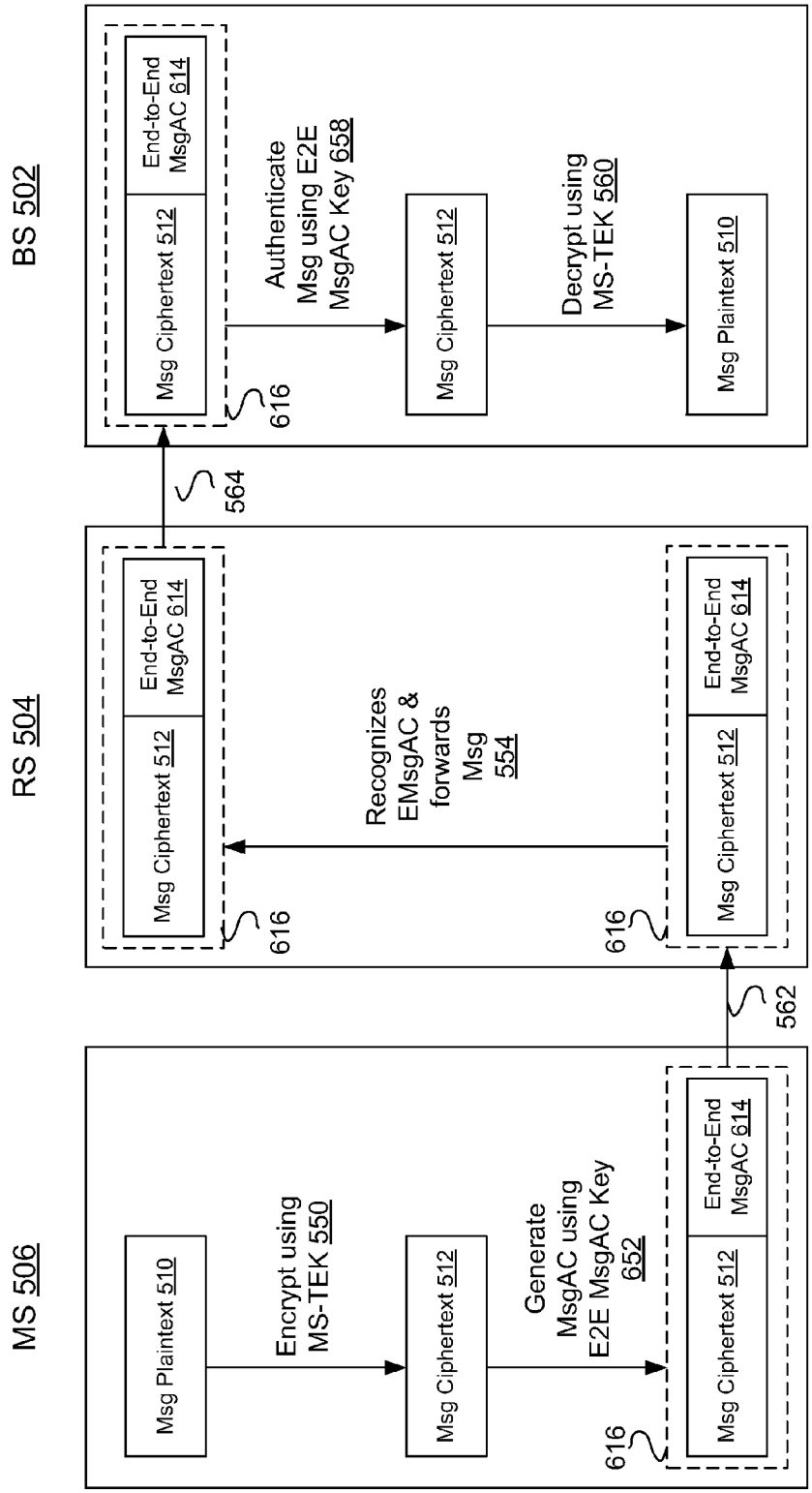
FIG. 6 is a block diagram of an example embodiment of a system in accordance with the disclosed subject matter.

FIG. 6 is a block diagram of an example embodiment of a system 600 in accordance with the disclosed subject matter. In various embodiments, the system 600 may include a BS 502, a RS 504, and a MS 506. In the illustrated embodiment, a message is transmitted in the uplink direction from the MS 506 to the BS 502. It is understood, that in other embodiments a message transmitted in the downlink direction from the BS 502 to the MS 506 may undergo a similar process. In various embodiments, the message of information transferred may include user data or control information, as described above.

In various embodiments, the MS 506 may encrypt a plaintext message 510 with a TEK to form a ciphertext message 512, as described above.

In various embodiments, the MS 506 may sign or generate an MsgAC 614 for the message using an End-to-End (E2E) MsgACK (EMsgACK) (illustrated by arrow 652). In some embodiments, the MS 506 may determine that the message being transmitted is not one that an RS (e.g., RS 504) should be allowed to manipulate. For example, the message may include a control message (e.g., MAC management message, etc.); although, it is understood that the above is merely one illustrative example to which the disclosed subject matter is not limited. In various embodiments, which messages may be allowed to be manipulated by an RS or must be authenticated E2E may be dictated by the networking standard used by the system 600; although, it is understood that the above is merely one illustrative example to which the disclosed subject matter is not limited.

In some embodiments, the MS 506 may transmit this message 616 (including the ciphertext 512 and the EMsgAC 614) to the RS 504 (illustrated by arrow 562), as described above.

In some embodiments, the RS 504 may determine that the message 616 includes an EMsgAC (e.g., EMsgAC 614) and is therefore authenticated from end-to-end. In various embodiments, a flag or parameter of a MsgAC (e.g., EMsgAC 614, AMsgAC 514, RMsgAC 518, etc.) may indicate whether or not the MsgAC is an EMsgAC or an IMsgAC, or other type of MsgAC. As a message that is authenticated E2E, the RS 504 may not manipulate the message (e.g., repacking, fragmenting, etc.), and may simply forward the message to the BS 502 (illustrated by arrow 554). In such an embodiment, the RS 504 may wirelessly transmit the message 616 to the BS 502 (illustrated by arrow 564).

In various embodiments, the BS 502 may authenticate the message 616 using an EMsgACK associated with the originating MS 506 (illustrated by arrow 658). In various embodiments, the BS may maintain a plurality of EMsgACKs, at least one for each MS associated (either directly or indirectly) with the BS 502. Likewise, the BS may maintain a plurality of RMsgACKs, at least one for each RS associated with the BS 502. In yet another embodiment, the BS may maintain a plurality of AMsgACKs, at least one for each MS directly (without an intervening RS) associated with the BS. Although, it is understood that the above are merely a few illustrative examples to which the disclosed subject matter is not limited.

In various embodiments, if the message 616 fails this authentication process the BS 502 may discard the message 616, as described above. In other embodiments, the BS 502 may perform another form of authentication failure management and It is understood that the above is merely one illustrative example to which the disclosed subject matter is not limited.

In various embodiments, if the message 616 passes the authentication process, the BS 502 may decrypt the ciphertext 512 using the TEK associated with the MS 506 (illustrated by arrow 560), as described above. In various embodiments, this may result in the plaintext message 510, as described above.

FIG. 7 is a flow chart of an example embodiment of a technique 700 in accordance with the disclosed subject matter. In various embodiments, the technique 700 may be performed by the system of FIG. 1 or 2, or the apparatus of FIG. 3, as described above. In some embodiments, the technique 700 may be used to create the operations as illustrated by FIGS. 4, 5, and/or 6, as described above.

Block 702 illustrates that, in one embodiment, an end-to-end (E2E) MsgAC Key (EMsgACK) may be received from a base station (BS), as described above. In another embodiment, the EMsgACK or other MsgACKs may be derived from MS-AK, as described above. In various embodiments, an Intermediate MsgACK (IMsgACK) (e.g., a RMsgACK or AMsgACK) may be received from a BS or derived from RS-AK, as described above. In various embodiments, an AMsgACK may be received from an RS, as described above. In various embodiments, the action(s) illustrated by this block may be performed by various elements, such as the MS 106 of FIG. 1, the apparatus 301, the processor 304, transceiver 302 and/or the memory 306 of FIG. 3, as described above.

Block 704 illustrates that, in one embodiment, a message may be acquired, as described above. In various embodiments, acquiring may include receiving a message, for example from a MS or BS, as described above. In another embodiment, acquiring may include creating a message, such as for example, the plaintext message 510 of FIG. 5, as described above. In various embodiments, the action(s) illustrated by this block may be performed by various elements, such as the RS 220, MS 206 or BS 204 of FIG. 2, the apparatus 301, the processor 304, transceiver 302 and/or the memory 306 of FIG. 3, as described above.

Block 705 illustrates that, in one embodiment, the message may be encrypted based upon a traffic encryption key (TEK) known only to a mobile station and a base station, and not an RS, as described above. In various embodiments, the action(s) illustrated by this block may be performed by various elements, such as the MS 206 or BS 204 of FIG. 2, the apparatus 301, the processor 304, and/or the memory 306 of FIG. 3, as described above.

Block 706 illustrates that, in one embodiment, a determination may be made as to whether or not a relay station (RS) is allowed to manipulate portions of the message, as described above. In various embodiments, determining may include, if the acquired message includes a MsgAC generated by an Intermediate MsgAC Key (IMsgACK), determining that an RS is allowed to manipulate portions of the message, as described above. In another embodiment, determining may include making the determination based upon a connection identifier (CID) associated with the message, as described above. In various embodiments, the action(s) illustrated by this block may be performed by various elements, such as the RS 220, MS 206 or BS 204 of FIG. 2, the apparatus 301, the processor 304 and/or the memory 306 of FIG. 3, as described above.

Block 708 illustrates that, in one embodiment, if an RS is allowed to manipulate portions of the message, a message authentication code (MsgAC) may be generated based upon a MsgAC key (MsgACK) known to the RS, as described above. In one embodiment, generating may include authenticating the encrypted message resulting from Block 705, as described above. In some embodiments, authenticating may include removing a MsgAC included in the acquired message, and adding the generated MsgAC generated using the MsgACK, as described above. In another embodiment, generating may include generating using a RMsgACK, as described above. In yet another embodiment, generating may include generating using an AMsgACK, as described above. In various embodiments, the action(s) illustrated by this block may be performed by various elements, such as the RS 220, MS 206 or BS 204 of FIG. 2, the apparatus 301, the processor 304 and/or the memory 306 of FIG. 3, as described above.

Block 710 illustrates that, in one embodiment, if the RS is not allowed to manipulate portions of the message, generating a MsgAC based upon an end-to-end (E2E) MsgAC Key (EMsgACK), as described above. In various embodiments, the action(s) illustrated by this block may be performed by various elements, such as the MS 206 or BS 204 of FIG. 2, the apparatus 301, the processor 304 and/or the memory 306 of FIG. 3, as described above.

Block 712 illustrates that, in one embodiment, the acquired message may be combined with the MsgAC, as described above. In various embodiments, combining may include replacing an old MsgAC with the MsgAC generated by Blocks 708 or 710, as described above. In another embodiment, combining may include concatenating the acquired message or a portion thereof, with the generated MsgAC, as described above. In various embodiments, the action(s) illustrated by this block may be performed by various elements, such as the RS 220, MS 206 or BS 204 of FIG. 2, the apparatus 301, the processor 304 and/or the memory 306 of FIG. 3, as described above.

Block 714 illustrates that, in one embodiment, the combined message may be wirelessly transmitted to the RS or another device (e.g., a MS or BS, etc.), as described above. In various embodiments, the action(s) illustrated by this block may be performed by various elements, such as the RS 220, MS 206 or BS 204 of FIG. 2, the apparatus 301, the processor 304, transceiver 302 and/or the memory 306 of FIG. 3, as described above.

FIG. 8 is a flow chart of an example embodiment of a technique 800 in accordance with the disclosed subject matter. In various embodiments, the technique 800 may be performed by the system of FIG. 1 or 2, or the apparatus of FIG. 3, as described above. In some embodiments, the technique 800 may be used to create the operations as illustrated by FIGS. 4, 5, and/or 6, as described above.

Block 802 illustrates that, in one embodiment, a message may be received that includes a message authentication code (MsgAC), as described above. In some embodiments, the message may include a portion encrypted with a traffic encryption key (TEK) that the receiving device (e.g., a RS, etc.) does not know, as described above. In various embodiments, the action(s) illustrated by this block may be performed by various elements, such as the RS 220 of FIG. 2, the apparatus 301, the processor 304, transceiver 302 and/or the memory 306 of FIG. 3, as described above.

Block 804 illustrates that, in one embodiment, a determination may be made as to whether or not the MsgAC was created using an Intermediate MsgAC Key (IMsgACK), as described above. In various embodiments, an IMsgACK may include either an AMsgACK or a RMsgACK, as described above. In some embodiments, determining may include authenticating the message based upon the MsgAC, as described above. In various embodiments, the action(s) illustrated by this block may be performed by various elements, such as the RS 220 of FIG. 2, the apparatus 301, the processor 304 and/or the memory 306 of FIG. 3, as described above.

Block 805 illustrates that, in one embodiment, if the MsgAC was created using an End-to-End MsgAC Key (EMsgACK), the message may be wirelessly forwarded to the destination device (e.g., a BS or MS, etc.), as described above. In various embodiments, if the MsgAC was created using an EMsgACK the receiving device (e.g., a RS, etc.) may not perform any substantial manipulate (e.g., repacking, fragmenting, etc.) the message before forwarding, as described above. In various embodiments, the action(s) illustrated by this block may be performed by various elements, such as the RS 220 of FIG. 2, the apparatus 301, the processor 304, transceiver 302 and/or the memory 306 of FIG. 3, as described above.

Block 806 illustrates the start of the path that may occur, in various embodiments, if the MsgAC was created using an IMsgACK. Block 806 illustrates that, in one embodiment, the MsgAC may be removed from the message, as described above. In some embodiments, removing may include authenticating the message using the MsgAC and the IMsgACK, as described above. In various embodiments, the action(s) illustrated by this block may be performed by various elements, such as the RS 220 of FIG. 2, the apparatus 301, the processor 304 and/or the memory 306 of FIG. 3, as described above.

Block 808 illustrates that, in one embodiment, a new MsgAC may be generated based upon an IMsgACK known to a destination device, as described above. In such an embodiment, the IMsgACK used for generation may differ from the IMsgACK used by the removed MsgAC, as described above. In various embodiments, generating may include generating a new MsgAC based upon a RMsgACK known to the destination device, as described above. In another embodiment, generating may include generating a new MsgAC based upon an AMsgACK known to the destination device, as described above. In various embodiments, the action(s) illustrated by this block may be performed by various elements, such as the RS 220 of FIG. 2, the apparatus 301, the processor 304 and/or the memory 306 of FIG. 3, as described above.

Block 810 illustrates that, in one embodiment, a new message may be created that includes at least a portion of the received message and the new MsgAC, as described above. In one embodiment, creating may include repacking a plurality of portions from a plurality of messages into the new message, as described above. In another embodiment, generating may include fragmenting the received message into portions, and selecting at least a portion of the received message from which to create the new message, as described above. In such embodiments, generating (of Block 808) may include generating the new MsgAC based upon an IMsgACK and the new repacked message, as described above.

Block 812 illustrates that, in one embodiment, the new message may be wirelessly transmitted to the destination device (e.g., a BS or MS, etc.), as described above. In various embodiments, the action(s) illustrated by this block may be performed by various elements, such as the RS 220, MS 206 or BS 204 of FIG. 2, the apparatus 301, the processor 304, transceiver 302 and/or the memory 306 of FIG. 3, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
acquiring a message to be transmitted to a mobile station via a relay station (RS);
combining the message with a message authentication code (MsgAC) to form a combined message,
wherein combining includes:
determining if the relay station is configured to replace the MsgAC included by the combined message with a second MsgAC, and if so, generating the MsgAC based upon a MsgAC key (MsgACK) known to the RS;
wherein the determining includes performing the following:
if a message includes a user data type of message, causing the RS to be configured to replace the MsgAC of the combined message; and
if the acquired message includes a MsgAC generated by an Intermediate MsgAC Key (IMsgACK), determining that an RS is allowed to manipulate portions of the message; and
wirelessly transmitting the combined message to the RS.

2. The method of claim 1, wherein combining further includes: if the RS is not allowed to manipulate portions of the message, generating a MsgAC based upon an end-to-end (E2E) MsgAC Key (EMsgACK).

3. The method of claim 1 further including:
receiving an end-to-end (E2E) MsgAC Key (EMsgACK) from a base station (BS).

4. The method of claim 1 further including, before combining, encrypting the message based upon a traffic encryption key (TEK) known to the mobile station and the base station, but not the relay station; and
wherein generating includes authenticating the encrypted message.

5. The method of claim 4 wherein
authenticating includes:
removing the MsgAC included in the acquired message, and
adding the generated MsgAC generated using the IMsgACK.

6. The method of claim 1 wherein acquiring a message includes:
creating a message; and
encrypting the message with a traffic encryption key (TEK), wherein the TEK is not known to the RS.

7. The method of claim 1 wherein determining includes:
determining based upon a connection identifier (CID) associated with the message.

8. An apparatus comprising:
a processor and a transceiver; and
wherein the apparatus is configured to:
acquire a message to be transmitted to a mobile station via a relay station (RS),
combine the message with a message authentication code (MsgAC) to form a combined message, and
wirelessly transmit the combined message to the RS; and
wherein, as part of combining, the apparatus is configured to:
determine if the relay station is configured to replace the MsgAC included by the combined message with a second MsgAC, and if so, generate the MsgAC based upon a MsgAC key (MsgACK) known to the RS;

wherein the apparatus being configured to determine comprises the apparatus being configured to:

if a message includes a user data type of message, cause the RS to be configured to replace the MsgAC of the combined message; and if the acquired message includes a MsgAC generated by an Intermediate MsgAC Key (IMsgACK), determine that an RS is allowed to manipulate portions of the message.

9. The apparatus of claim 8 wherein the apparatus is configured to:

if the RS is not allowed to replace portions of the combined message, generate a MsgAC based upon an end-to-end (E2E) MsgAC Key (EMsgACK).

10. The apparatus of claim 8 wherein the apparatus is configured to:

derive an end-to-end (E2E) MsgAC Key (EMsgACK) locally based upon at least one pre-defined rule and an end-to-end (E2E) MsgAC Key (EMsgACK) from a base station (BS).

11. The apparatus of claim 8 wherein the apparatus is configured to:

encrypt the message based upon a traffic encryption key (TEK) known to the mobile station and the base station, but not the relay station.

12. The apparatus of claim 8 wherein the apparatus is configured to:

remove the MsgAC included in the acquired message; and add the generated MsgAC generated using the IMsgACK.

13. The apparatus of claim 8 wherein the apparatus is configured acquire the message by:

creating a message; and encrypting the message with a traffic encryption key (TEK), wherein the TEK is not known to the RS.

14. The apparatus of claim 8 wherein the apparatus is configured to:

determine based upon a connection identifier (CID) associated with the message.

15. An apparatus comprising:

a processor configured to:

receive a message that includes: a message authentication code (MsgAC) and at least a destination device portion that includes information for a destination device;

determine if the MsgAC was created using an Intermediate MsgAC Key (IMsgACK); and if so, remove the MsgAC from the message, generate a new MsgAC based upon an IMsgACK known to the destination device, create a new message including at least the destination device portion of the received message and the new MsgAC, and cause the new message to be wirelessly transmitted to the destination device;

wherein the processor being configured to determine comprises the processor being configured to:

if a message includes a user data type of message, cause the RS to be configured to replace the MsgAC of the combined message; and if the acquired message includes a MsgAC generated by an Intermediate MsgAC Key (IMsgACK), determine that an RS is allowed to manipulate portions of the message.

16. The apparatus of claim 15 wherein the processor is configured to:

if the MsgAC was created using an End-to-End MsgAC Key (EMsgACK), cause the message to be wirelessly forwarded to the destination device.

17. An apparatus comprising:

a means for acquiring a message to be transmitted to a mobile station via a relay station (RS);

a means for combining the message with a message authentication code (MsgAC) to form a combined message;

a means for determining if the relay station is configured to replace the MsgAC included by the combined message with a second MsgAC, a means for, if the relay station is configured to replace a portion of the combined message, generating a message authentication code (MsgAC) based upon a MsgAC key (MsgACK) known to the RS; and a means for wirelessly transmitting the combined message to the RS;

wherein the means for determining comprises means for performing the following:

if a message includes a user data type of message, causing the RS to be configured to replace the MsgAC of the combined message; and if the acquired message includes a MsgAC generated by an Intermediate MsgAC Key (IMsgACK), determining that an RS is allowed to manipulate portions of the message.

18. The apparatus of claim 17, further including:

a means for encrypting the message based upon a traffic encryption key (TEK) known to a mobile station (MS) and a base station (BS), but not a RS.

* * * * *